2,125,292

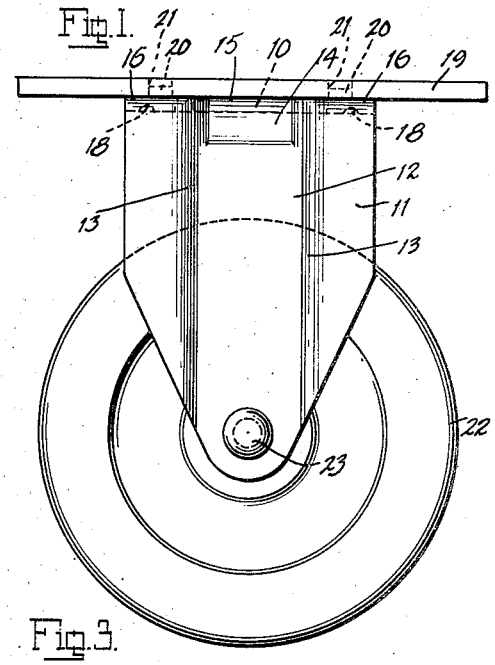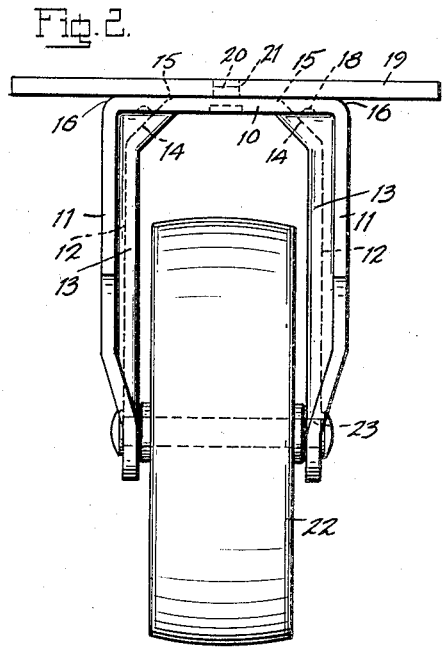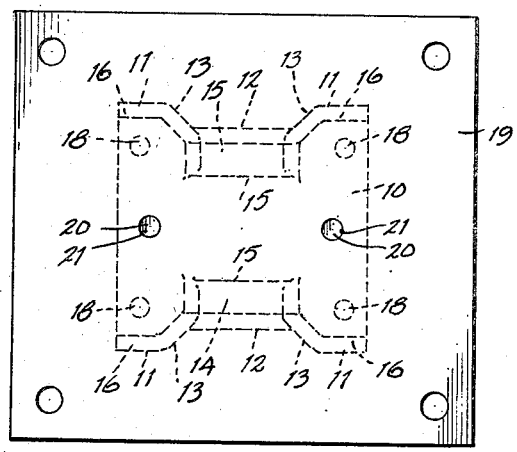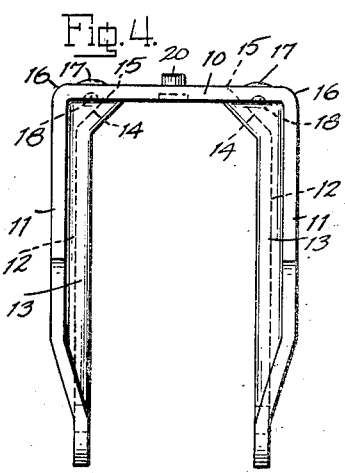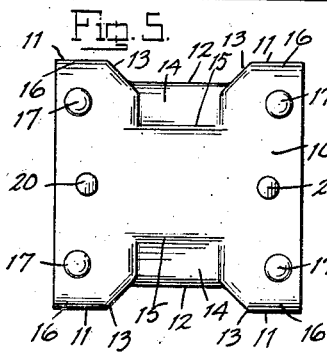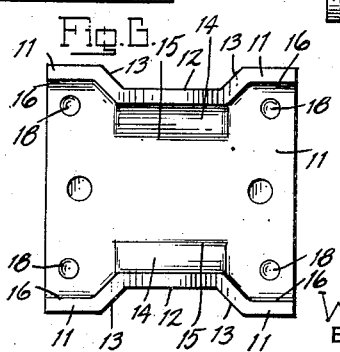
INVENTOR
WALTER F. HEROLD
BY
ATTORNEY Patented Aug. 2, 1938

UNITED STATES PATENT OFFICE 2,125,292

CASTER

Walter F. Herold, Bridgeport, Conn., assignor to The Bassick Company, Bridgeport, Conn., a corporation of Connecticut Application July 3, 1937, Serial No. 151,848

3 Claims. (Cl. 16—40)

The present invention relates to an improvement in casters, particularly heavy duty truck casters of the so called stationary type, that is, in which the horn is rigidly mounted so that it does not have swivelling action. It is an object of the invention to provide a caster of this type in which the attaching plate and the horn are formed of sheet steel or the like, and are rigidly connected together, as by welding, into an integral unit. It is a further object to provide a horn which is bent and pressed to shape, and in which the sides of the horn are supported against distortion and bending by reinforcing strut portions pressed therein and disposed in such relation to the points at which the horn is secured to the attaching plate that the attaching plate cooperates with the reinforcing means to rigidly support the sides against either inward or outward distortion and bending. It is a further object to provide a caster of relatively great strength, but which because of the structural formation and arrangement of the sheet steel will be comparatively light in weight.

With the above and other objects in view an embodiment of the invention is shown in the accompanying drawing, and this embodiment will be hereinafter more fully described with reference thereto, and the invention will be finally pointed out in the claims.

In the drawing:

Fig. 1 is a side elevation of a truck caster, according to the exemplary illustrated embodiment of the invention.

Fig. 2 is a front elevation.

Fig. 3 is a top plan view.

Fig. 4 is a front elevation of the horn showing the same before securing to the attaching plate.

Fig. 5 is a top plan view of the horn.

Fig. 6 is a bottom plan view thereof.

Similar reference characters indicate corresponding parts throughout the several figures of the drawing.

Referring to the drawing, the caster, according to the exemplary illustrated embodiment of the invention, comprises a horn formed of heavy gauge sheet steel pressed to shape by suitable dies in a press, and consisting of a top portion 10, of generally rectangular shape, and side legs 11—11. The central vertical portion of each of the side legs is inwardly embossed, as at 12, this inwardly embossed portion being flat and there being bends 13—13 between this flat portion and the vertical outwardly offset marginal portions.

At the upper ends of the portions 12 there are provided diagonally extending embossed recesses 14—14, which form spanning truss portions between the portions 12 and the intermediate portion of the top 10, the bends 15—15 between the portions 14—14 and the top being inwardly offset for a considerable distance with respect to the bends 16 between the top 10 and the vertical marginal portions of the side legs.

In each of the four corners of the top there is formed a projection 17 which is projected outwardly by suitable punch and die formations in the press, the punch producing recesses at the under side of the top, as at 18. These projections 17 are for the purpose of providing projection welding points for welding to the attaching plate 19, the welding process by electric projection welding means being such that the projections 17 become integrally fused with the metal of the plate 19, and in the secured relation, as shown in Figs. 1, 2 and 3 are forced into and become integral parts of the plate, the plate seating tightly against the top of the horn. In order to insure proper position of the plate 19 a pair of positioning pins 20 are embossed from the top 10 and engage apertures 21 in the plate 19.

The welding points are positioned in each corner of the top between the parallel spaced lines of the bend 15 and the bend 16, so that one side of each of the substantially triangular formations, provided by the top 10, the portions 14—14, and the side legs, is rigidly secured at a point between the other two sides of the triangular formation. The leg is thus rigidly supported against any possibility of bending in either direction, the strut portion 14 and the secured top preventing bending about the bends 16 through inward pressure, and bending about the points 15 being prevented by arrangement of the welding points in outwardly offset relation to the bends 15. Bending through outward pressure is prevented by the strut portions 14 acting as ties between the side legs and the horn top.

A wheel 22 is supported between the side legs of the horn upon a suitable axle 23.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a caster, a wheel supporting horn comprising a top and a pair of side legs extending downwardly therefrom and connected thereto by bends, there being an indentation at the upper end of each of said legs, spaced from the front and rear edges of the horn, its upper end being at a point in said top inwardly spaced from the leg connecting bend and its lower end being at a point in the leg downwardly spaced from said top, and an attaching plate rigidly secured to said top at securing points located between said leg connecting bends and lines coinciding with the upper ends of said indentations.

2. In a caster, a wheel supporting horn comprising a top and a pair of side legs extending downwardly therefrom and connected thereto by parallel bends, there being an indentation at the upper end of each of said legs spaced from the front and rear edges of the horn, its upper end being at a point in said top inwardly spaced from the leg connecting bend and its lower end being at a point in the leg downwardly spaced from said top, and an attaching plate rigidly secured to said top at securing points located in the corner areas of said top between said parallel leg connecting bends and lines parallel therewith and coinciding with the upper ends of said indentations.

3. In a caster, a wheel supporting horn comprising a top and a pair of side legs extending downwardly therefrom, said legs each having vertically extending outwardly offset marginal portions and a vertically extending inwardly offset portion therebetween, said portions being connected to said top by bends, there being a diagonal indentation at the upper end of each of said inwardly offset portions, its upper end being at a point in said top inwardly spaced from the leg connecting bends and its lower end being at a point in the leg downwardly spaced from said top, and an attaching plate rigidly secured to said top at securing points located between said leg connecting bends and lines coinciding with the upper ends of said indentations.

WALTER F. HEROLD.